United States Patent
Becka

(10) Patent No.: US 10,626,978 B2
(45) Date of Patent: Apr. 21, 2020

(54) TRANSMISSION WITH OIL COOLING

(71) Applicant: Flender GmbH, Bocholt (DE)

(72) Inventor: Simon Becka, Wesel (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 16/135,690

(22) Filed: Sep. 19, 2018

(65) Prior Publication Data
US 2019/0085970 A1  Mar. 21, 2019

(30) Foreign Application Priority Data
Sep. 20, 2017  (EP) .................... 17192038

(51) Int. Cl.
F16H 57/04 (2010.01)
F16H 57/031 (2012.01)
B60K 11/04 (2006.01)
F28D 21/00 (2006.01)
F16H 57/02 (2012.01)

(52) U.S. Cl.
CPC .......... F16H 57/0416 (2013.01); B60K 11/04 (2013.01); F16H 57/031 (2013.01); F16H 57/0413 (2013.01); F16H 57/0417 (2013.01); F16H 57/0435 (2013.01); F16H 57/0436 (2013.01); F16H 57/0441 (2013.01); F16H 57/0495 (2013.01); F16H 2057/02043 (2013.01); F28D 2021/0089 (2013.01)

(58) Field of Classification Search
CPC ............... F16H 57/0416; F16H 57/031; F16H 57/0413; F16H 57/0417; F16H 57/0435; F16H 57/0436; F16H 57/0441; F16H 57/0495; B60K 11/04
See application file for complete search history.

(56) References Cited

U.S. PATENT DOCUMENTS

| 2,802,548 A * | 8/1957 | Mart ................... F16H 57/0415 184/6.12 |
| 6,997,284 B1 * | 2/2006 | Nahrwold ........... F16H 57/0447 165/117 |
| 9,951,859 B2 | 4/2018 | Becka |
| 2016/0312877 A1 | 10/2016 | Becka |

FOREIGN PATENT DOCUMENTS

| DE | 102009022329 A1 | 12/2010 |
| DE | 102012022023 A1 | 5/2014 |
| DE | 102012022025 A1 | 5/2014 |
| EP | 2917609 B1 | 9/2016 |

* cited by examiner

Primary Examiner — Thomas C Diaz
(74) Attorney, Agent, or Firm — Henry M. Feiereisen LLC

(57) ABSTRACT

A transmission includes a transmission housing with an oil reservoir and a transmission housing cover to close an opening of the transmission housing. A transmission shaft receives a toothed wheel and which can be driven by way of a motor. A cooler is arranged on the outside of the transmission housing, with a fan arranged on the outside of the transmission housing feeding cooling air to the cooler. An oil delivery pump pumps oil through oil delivery lines from the oil reservoir to the cooler, with an oil return line routing oil from the cooler back to the transmission housing. A separate drive motor drives the fan and the oil delivery pump independently of the transmission shaft, with the drive motor, the fan, the cooler and the oil delivery pump being fastened to the transmission housing cover.

6 Claims, 1 Drawing Sheet

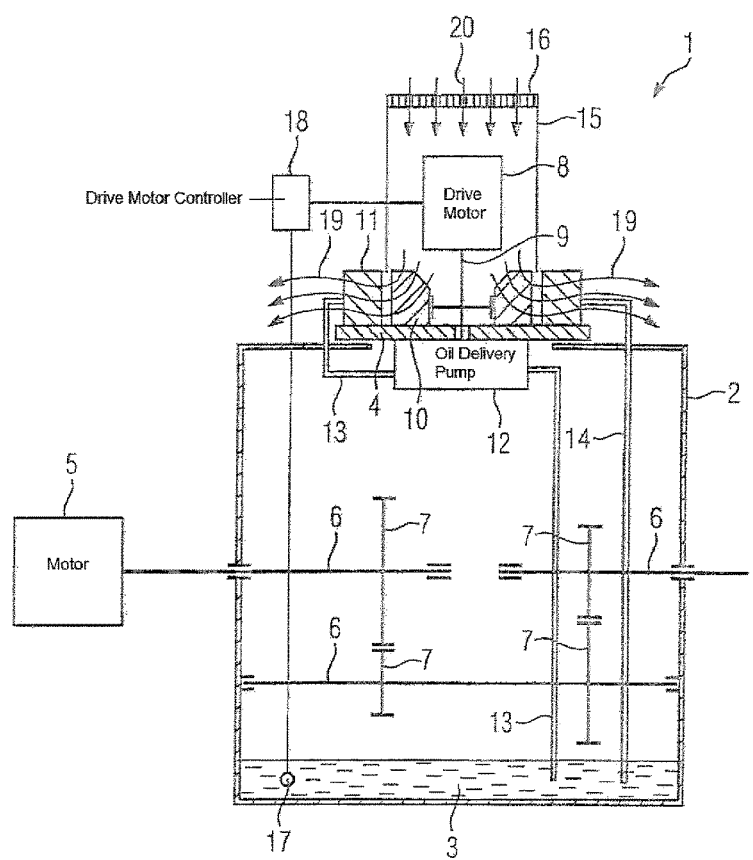

TRANSMISSION WITH OIL COOLING

CROSS-REFERENCES TO RELATED APPLICATIONS

This application claims the priority of European Patent Application, Serial No. 17192038.2, filed Sep. 20, 2017, pursuant to 35 U.S.C. 119(a)-(d), the disclosure of which is incorporated herein by reference in its entirety as if fully set forth herein.

BACKGROUND OF THE INVENTION

The present invention relates to a transmission.

The following discussion of related art is provided to assist the reader in understanding the advantages of the invention, and is not to be construed as an admission that this related art is prior art to this invention.

Transmissions are known in a variety of designs from the prior art. During operation, they can heat up significantly due to incurring power loss, which may result in the permissible mechanical rating being limited. As a counter measure, transmissions are frequently cooled in order to be able to release the full mechanical power as far as possible. There are various approached for cooling a transmission.

One approach involves a cooling of transmission oil across a transmission housing surface. The achievable cooling power is however significantly restricted by the available transmission housing surface. While it is conceivable to enlarge the surface through provision of ribs or the like, this is cost-intensive however.

Another approach involves the use of external cooling units for cooling transmissions. An oil delivery pump delivers hereby oil from the transmission housing to an externally installed cooling unit, which is normally embodied in the form of a cooling fin as an oil-air cooler. The problem here however is that the installation space required for the overall system is enlarged and the cooling unit represents a further separate module which is frequently not desired.

It would therefore be desirable and advantageous to provide an improved transmission to obviate prior art shortcomings.

SUMMARY OF THE INVENTION

According to one aspect of the present invention, a transmission includes a transmission housing having an oil reservoir, a transmission housing cover configured to close an opening of the transmission housing, a motor-driven transmission shaft, a toothed wheel mounted on the transmission shaft, a cooler arranged on an outside of the transmission housing, a fan arranged on the outside of the transmission housing and configured to feed cooling air to the cooler, an oil delivery pump configured to pump oil through an oil delivery line from the oil reservoir to the cooler, an oil return line configured to route oil from the cooler back to the transmission housing, and a drive motor configured to drive the fan and the oil delivery pump independently of the transmission shaft, wherein the drive motor, the fan, the cooler and the oil delivery pump are fastened to the transmission housing cover.

The present invention resolves prior art problems by providing, i.a., a separate drive motor to drive the fan and the oil delivery pump independently of the transmission shaft and by fastening the drive motor, the fan, the cooler and the oil delivery pump to the transmission housing cover. The transmission housing cover, the drive motor, the fan, the cooler and the oil delivery pump thus form a cooling unit which is fastened by way of the transmission housing cover to the transmission housing and is embodied in a very compact manner. This is advantageous when carrying out maintenance and repair works since all components are easy to access and can be assembled and disassembled without difficulty. Furthermore, such a unit can be arranged on almost any position of the transmission housing, and thus affords a designer significant freedom when designing the transmission. As the drive motor is provided as a separate motor, i.e. in addition to a motor driving the transmission shaft or transmission shafts of the transmission, the oil volume flow fed to the cooler as well as the cooling air volume flow generated by the fan can also be adjusted irrespective of the mode of operation of the transmission by suitably selecting the speed of the separate drive motor. A further advantage associated with the use of a separate drive motor for driving the oil delivery pump and the fan resides in the fact that there is no need to configure the oil delivery pump and the fan independently of the direction of rotation. Accordingly, these components can be configured optimally, thereby lowering energy consumption and reducing sound emission of the fan.

According to another advantageous feature of the present invention, the drive motor can be an electric motor. In this way, a simple design is realized.

According to another advantageous feature of the present invention, the cooler can be an annular radial cooler which surrounds the fan and to which cooling air is fed radially by the fan. The use of such a radial cooler results in a very compact and efficient design.

According to another advantageous feature of the present invention, the oil delivery pump can be fastened to an inside of the transmission housing cover. The oil delivery pump is therefore protected from external influences by the transmission housing cover or the transmission housing itself.

According to another advantageous feature of the present invention, a hood can be provided to cover the drive motor and the fan and can have an air intake opening, with a filter being disposed in the air intake opening. In this way contamination of the fan and of the cooler can be reduced.

According to another advantageous feature of the present invention, provision can be made for a sensor to detect a current oil temperature in the transmission housing, and for a drive motor controller to regulate a speed of the drive motor as a function of a signal detected by the sensor on the basis of a target oil temperature.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic illustration of a transmission according to the present invention.

DETAILED DESCRIPTION OF PREFERRED EMBODIMENTS

The depicted embodiment is to be understood as illustrative of the invention and not as limiting in any way. It should also be understood that the FIGURE may not necessarily be to scale. In certain instances, details which are not necessary for an understanding of the present invention or which render other details difficult to perceive may have been omitted.

Turning now to the FIGURE, there is shown a schematic illustration of a transmission according to the present invention, generally designated by reference numeral 1. The transmission 1 includes a transmission housing 2 with an oil reservoir 3 that is embodied as an oil sump, and a transmission housing cover 4 closing an opening of the transmission housing 2. The transmission shafts 6 driven by way of a motor 5 and the toothed wheels 7 held thereupon are received within the transmission housing 2. For the purpose of cooling the oil, the transmission 1 also includes a cooling unit with a drive motor 8, a drive shaft 9 driven by the drive motor 8, a fan 10, a cooler 11 and an oil delivery pump 12. The drive motor 8 is held on the outside of the transmission housing cover 4 and is currently embodied as an electric motor. The fan 10 and the cooler 11 are also mounted on the outside of the transmission housing cover 4, with the cooler 11 being configured as an annular radial cooler which surrounds the fan 10. The oil delivery pump 12 pumps oil through oil delivery lines 13 from the oil reservoir 3 to the cooler 11, which in turn is connected via an oil return line 14 to the oil reservoir 3. The oil delivery pump 12 is mounted to the inside of the transmission housing cover 4. Both the fan 10 and the oil delivery pump 12 are coupled kinematically with the drive shaft 9 which extends through the transmission housing cover 4, so that the fan 10 and the oil delivery pump 12 can thus be driven by way of the drive motor 8. A hood 15 which covers the drive motor 8 and the fan 10 is also fastened detachably to the transmission housing cover 4. The hood 15 having an air intake opening provided with a filter 16. A sensor 17 detecting the current oil temperature is positioned within the transmission housing 2. The sensor 17 is immersed in the oil reservoir 3 and transmits a detected signal to a drive motor controller 18. The drive motor controller 18 is configured to regulate the speed of the drive motor 8 as a function of the signal detected by the sensor 17 on the basis of a target oil temperature.

During operation of the transmission 1, the motor 5 drives the transmission shafts 6 and the toothed wheels 7 held thereon. Oil available inside the transmission housing 2 is heated by the incurring power loss. For cooling purposes, the oil is pumped through the oil delivery lines 13 to the cooler 11 by the oil delivery pump 12 which is powered by the drive motor 8, and the oil is routed from there via the oil recovery line 14 back to the oil reservoir 3. An air flow generated by the fan 10 which is also driven by the drive motor 8 passes radially through the cooler 11, as indicated by arrows 19. The air flow removes heat from the oil and thereby cools the oil. The fan 10 is fed with ambient air filtered by way of the filter 16, as indicated by arrows 20. The sensor 17 detects the current oil temperature, which is compared in the drive motor controller 18 with a previously adjustable target temperature. When the detected actual temperature deviates upward from the target temperature, the speed of the drive motor 8 is regulated accordingly in order to achieve the desired cooling power.

One significant advantage of the transmission 1 resides in the fact that the transmission housing cover 4, the drive motor 8, the fan 10, the cooler 11 and the oil delivery pump 12 define a cooling unit which is fastened via the transmission housing cover 4 to the transmission housing 2 and very compact. This cooling unit is easily accessible and can easily be assembled and disassembled, thereby significantly facilitating maintenance and repair works of the cooling unit or its components. Furthermore, such a cooling unit can be arranged at almost any opening of a transmission housing 2, which is closed with a transmission housing cover 4. This affords a designer significant freedom when designing the transmission. Due to the fact that the drive motor 8 is provided as a separate motor, i.e. in addition to the motor 5 that drives the transmission shafts 2 of the transmission. 1, the oil volume flow fed to the cooler 11 as well as the cooling air volume flow generated by the fan 10 can also be adjusted by suitably selecting the speed of the separate drive motor 8 irrespective of the mode of operation of the transmission 1. A further advantage associated with the use of a separate drive motor 8 for driving the oil delivery pump 12 and the fan 10 resides in the fact that there is no need for the oil delivery pump 12 and the fan 10 to be configured in a manner independent of the direction of rotation. Accordingly, these components can be configured optimally, thereby lowering energy consumption and reducing sound emission of the fan 10.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A transmission, comprising:
   a transmission housing having an oil reservoir;
   a transmission housing cover closing an opening of the transmission housing;
   a motor-driven transmission shaft;
   a toothed wheel mounted on the transmission shaft;
   a cooler arranged on an outside of the transmission housing;
   a fan arranged on the outside of the transmission housing and configured to feed cooling air to the cooler;
   an oil delivery pump configured to pump oil through oil delivery lines from the oil reservoir to the cooler;
   an oil return line configured to route oil from the cooler back to the transmission housing; and
   a drive motor configured to drive the fan and the oil delivery pump independently of the transmission shafts,
   wherein the drive motor, the fan, the cooler and the oil delivery pump are fastened to the transmission housing cover.

2. The transmission of claim 1, wherein the drive motor is an electric motor.

3. The transmission of claim 1, wherein the cooler is an annular radial cooler which surrounds the fan and to which cooling air is fed radially by the fan.

4. The transmission of claim 1, wherein the oil delivery pump is fastened to an inside of the transmission housing cover.

5. The transmission of claim 1, further comprising a hood covering the drive motor and the fan, said hood having an air intake opening, and further comprising a filter disposed in the air intake opening.

6. The transmission of claim 1, further comprising a sensor configured to detect a current oil temperature in the transmission housing, and a drive motor controller configured to regulate a speed of the drive motor as a function of a signal detected by the sensor on the basis of a target oil temperature.

\* \* \* \* \*